(No Model.)
H. D. CUSHMAN.
APPARATUS FOR MAKING MENTHOL CRYSTALS.
No. 402,907. Patented May 7, 1889.
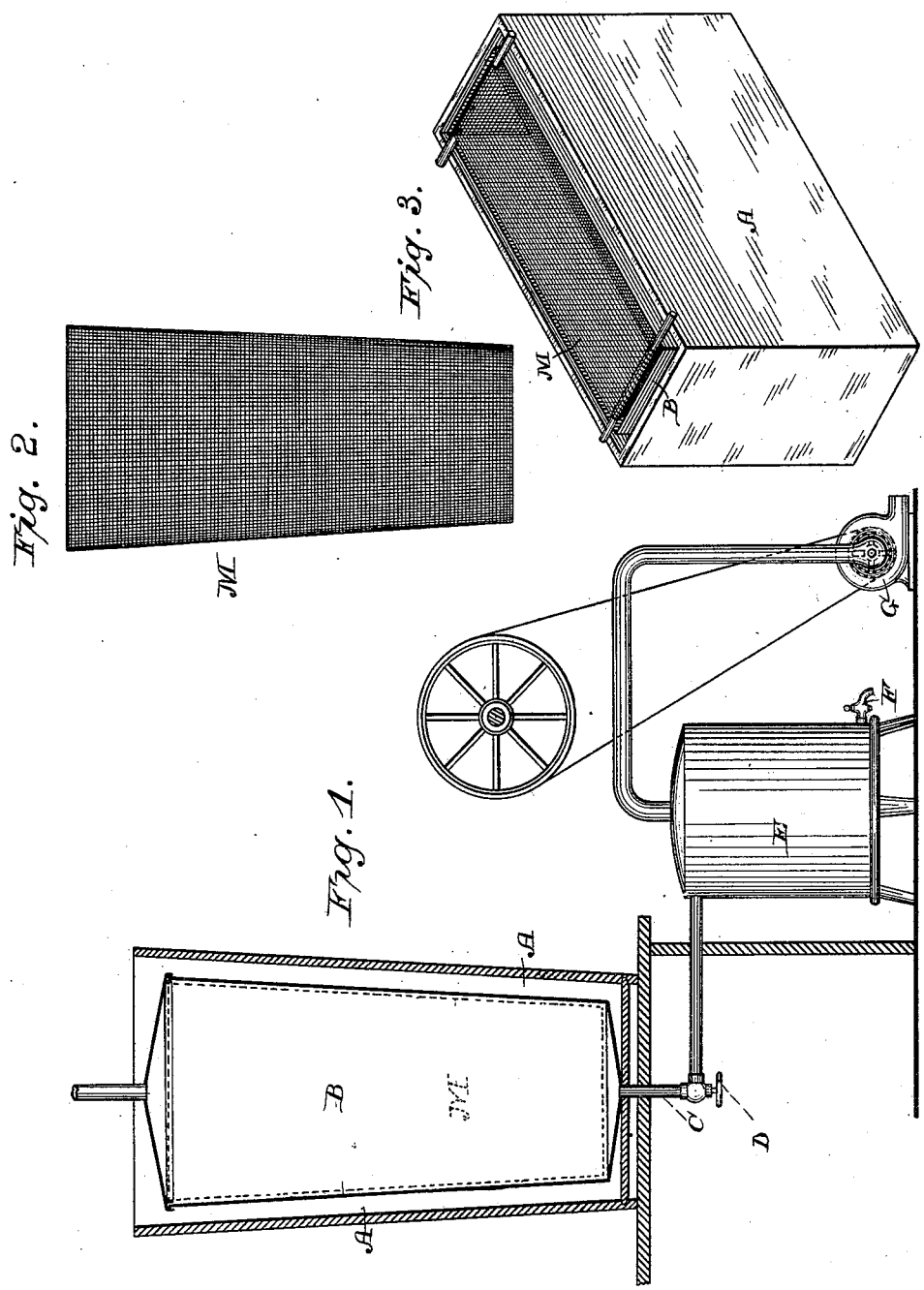
WITNESSES
E. C. Newman
C. M. Newman
INVENTOR.
Henry D. Cushman,
By his Attorneys
Baldwin Hopkins & Peyton.

UNITED STATES PATENT OFFICE.

HENRY D. CUSHMAN, OF THREE RIVERS, MICHIGAN.

APPARATUS FOR MAKING MENTHOL CRYSTALS.

SPECIFICATION forming part of Letters Patent No. 402,907, dated May 7, 1889.

Application filed June 13, 1887. Serial No. 241,216. (No model.)

*To all whom it may concern:*

Be it known that I, HENRY D. CUSHMAN, of Three Rivers, in the county of St. Joseph and State of Michigan, have invented certain new and useful Improvements in the Manufacture of Menthol Crystals, of which the following is a specification, reference being had to the accompanying drawings.

The object of my invention is to rapidly manufacture menthol crystals suitable for use in inhalers such as patented by me for medicinal purposes. Heretofore the processes employed, so far as I am aware, have been comparatively slow; but I have discovered that the manufacture of menthol crystals can be carried on speedily by means and methods which I have devised that are of great practical advantage.

In the accompanying drawings, Figure 1 is an elevation, partly in section, of an apparatus adapted to carry out my quick process of manufacturing menthol crystals. Fig. 2 is a view of a wire or open-work basket, and Fig. 3 is a view of a modified form of refrigerating apparatus.

Referring to the letters upon the drawings, A in Fig. 1 indicates a tub or circular vessel for containing any ordinary substance for rapidly reducing the temperature of liquids. B is a vessel set within the vessel A for containing oil of peppermint, provided at its bottom with a pipe, C, and a cock, D, the pipe leading to a vessel, E, which may be provided with a faucet, F.

G indicates an ordinary exhaust or fan blower, which may be driven by any suitable machinery in any ordinary way (not illustrated) applied so as to exhaust or suck air through the vessel B. Instead of this a vacuum-pump might be used.

In using this apparatus to make menthol I proceed as follows: I first fill the vessel B with the oil of peppermint. I then pack salt and ice around it in the vessel A, or I employ any other ordinary substance used to rapidly absorb heat and reduce the temperature of adjacent bodies. As soon as the temperature of the oil of peppermint is reduced sufficiently— say to from 60° Fahrenheit above to 6° Fahrenheit below zero—crystals will form in the oil. The temperature at which the crystals begin to form should be maintained at as near a uniform degree as possible for from five to forty-eight hours, depending a good deal upon the quantity of menthol the oil contains, the size of the receptacle, and the condition of the oil used. As soon as the crystals are properly formed from the effects of the cold, which can be determined by inspection, I open the cock D and permit the oil to flow rapidly out of the vessel B into the vessel E. This will occupy a few moments. I then set into operation the exhaust-fan or blower and draw the air rapidly through the crystalline mass remaining in the vessel B. If the degree of cold has been lower than that at which the crystals began to form, so that the crystals are very dense in the bottom of the vessel B and the oil does not readily run off from them, the blower may be started slowly as soon as the cock D is open, so as to produce a partial vacuum in the vessel E, and thus hasten the removal of the oil from the crystals. In this manner I readily remove all of the liquid, or substantially all of it, without disturbing the crystals, after which I can remove them in a dry state and use them in my inhalers, or otherwise, for medicinal purposes.

M, Fig. 2, indicates a wire-work basket adapted to fit in the vessel B, and when the crystals are dry this basket can be lifted out with the crystals in it, if the basket be used.

It has heretofore been mistakenly supposed that it was necessary to consume considerable time (about three days under a low temperature) in slowly draining off the remaining oil after crystallization, in order to avoid disturbing the crystals and carrying them away with the liquid residuum. This I have discovered is not necessary for my purpose or to produce a crystalline product well adapted for use in inhalers; and I have demonstrated that after proper crystallization by the application of cold in the way described, or in any usual way by reducing the temperature, as above described—that is to say, enough but not too much for good crystallizing effects—I may then draw off the liquid residuum quickly and at once apply a blower and thoroughly suck it away by the action of the air and dry the crystals ready for use in a very little while, which shortens, simplifies, and reduces the expense of manufacturing menthol crystals for use in inhalers materially.

No care need be taken, as has been supposed, to gradually raise the temperature of the crystals after they have been thus produced and dried; but they may be removed in ordinary atmospheric temperatures of manufactories without harm, and, if desired, further dried by exposure to the air or by spreading on paper or other absorbent material and promptly used in inhalers, as is the case generally with properly-formed menthol crystals. Such crystals as I form will not be liable to dissolve under ordinary atmospheric temperatures in which inhalers are used or kept, or under about 100° Fahrenheit.

In Fig. 3 I have shown an oil-vessel, B, of rectangular instead of circular form, as shown in Fig. 1. This rectangular-shaped vessel conforms more to the ordinary shape of the water-vessel used in ice-machines, and contains a comparatively thin column of liquid. In the same figure, A indicates a rectangular vessel, of greater length and height than thickness, for containing the vessel B and ice or other refrigerating material.

M indicates a removable wire-work basket, preferably open on top, which I insert edgewise in the vessel B, which it fits. I then put the oil of peppermint into the vessel B and surround the vessel with salt and ice or other suitable substance to lower the temperature of the liquid. Crystals will form somewhat more freely and rapidly in this form of vessel than in that form shown in Fig. 1. As soon as the crystals have properly formed, which can be determined by inspection—say generally within five to thirty hours, according to the quality of the oil and its degree of heat when poured into the vessel B—I lift the basket up about an inch or more, so as to allow free passage under it, and support it in any convenient way, and then I open a cock, D, and draw off the liquid remaining uncrystallized into another vessel, and then apply a blower, in the manner described with reference to Fig. 1, and not necessary to again illustrate in connection with Fig. 2.

The object of the wire-work basket is to facilitate the removal of crystals formed in the rectangular vessel B. By removing the basket I am able to take out the crystals bodily, either before or after they have been subjected to the action of the blower, when I can place the basket on a proper support or over a vessel, into which any remaining drops of liquid may fall, and where the crystals may be subjected, if desired, to a period of rest for the purpose of solidifying and further drying by evaporation, though practically, as a rule, the blower will very soon dry them and leave them in fair condition for use in inhalers, and they need only to be taken out and drained and dried in this way when the blower is not applied to use. The blower need only be used a short time—say from a few minutes to an hour or two. When the weather is sufficiently cold, it will not be necessary to use any vessel A. All that is necessary is to reduce the temperature of the oil of peppermint to a proper degree while it stands motionless. In case a blower should not be convenient to the manufacturer or should happen to get out of order, the open-work basket will prove specially convenient, because as soon as the bulk of liquid has been drained off rapidly the basket can be removed without disturbing the crystals, they adhering to it and coming out bodily, very much as honey-comb can be taken out of a hive by merely removing the honey-box in which the comb is formed and to which it adheres. Then the basket containing the crystals can be set over a vessel and the crystals left to drain and dry. On account of the thinness of the basket the crystals will be thoroughly subjected to the action of the atmosphere, which will aid by evaporation in drying them, so that even without the use of a blower, when the basket is used to remove the crystals bodily from the rectangular vessel B, the operation of drying the crystals is greatly speeded.

I am aware that it has been proposed by Mr. Albert M. Todd, in his United States Patents Nos. 337,716 and 10,705, to employ centrifugal machines for drying the crystals after partial isolation by placing the crystals in a wire-gauze receptacle, which is revolved by suitable gearing, so that the action of centrifugal force brought to bear upon the crystals causes the oil to flow outwardly from them through the reticulations of the gauze receptacle into a surrounding receptacle, which is adapted to catch the oil, and also to retain any of the small crystals which may come through the reticulations of the gauze receptacle with the oil under action of centrifugal force. By using my blower I avoid giving motion to the crystals by rotation, and also the suction I use acts on the oil conjointly with gravity in the same direction, so that I cause no disturbance of the crystals and no waste of them by escape through the reticulated fabric, the crystals remaining in the operation of drying as still and undisturbed as in the operation of forming and just as formed by the action of cold, which is practically important.

Having thus described my invention, what I claim to be new, and desire to secure by Letters Patent of the United States, is—

1. The combination of the vessel B, having openings in the top and bottom for the ingress and egress of air, the removable basket M, adapted to closely fit within the vessel B, and the vessel A, that incloses the vessel B and contains the cooling agent, substantially as set forth.

2. The combination of the vessel B, having openings in the top and bottom for the ingress and egress of air, the removable basket M, adapted to closely fit within the vessel B, the vessel A, that incloses the vessel B and contains the cooling agent, and an exhaust fan or pump connected by a pipe with the bottom of vessel B, substantially as set forth.

In testimony whereof I have hereunto subscribed my name.

HENRY D. CUSHMAN.

Witnesses:
WM. O. PEALER,
MARGARET SICKLER.